United States Patent [19]

Yamanaka et al.

[11] 4,170,971

[45] Oct. 16, 1979

[54] PNEUMATIC PRESSURE CONTROL VALVE ASSEMBLY

[75] Inventors: Minoru Yamanaka; Yasuhiro Kawabata, both of Toyota, Japan

[73] Assignee: Aisin Seiki Kabushiki Kaisha, Kariya, Japan

[21] Appl. No.: 799,035

[22] Filed: May 20, 1977

[30] Foreign Application Priority Data

May 21, 1976 [JP] Japan ................................. 51-59347

[51] Int. Cl.² ............................................. F02M 25/06
[52] U.S. Cl. ............................... 123/119 A; 123/97 B
[58] Field of Search ......................... 123/119 A, 97 B; 251/61.2, 61.5, 28

[56] References Cited

U.S. PATENT DOCUMENTS

| | | | |
|---|---|---|---|
| 2,728,547 | 12/1955 | Crookston et al. | 251/28 |
| 3,669,083 | 6/1972 | Fort | 123/97 B |
| 3,858,842 | 1/1975 | Yoshimura | 251/61.2 |
| 4,053,543 | 10/1977 | Petititt | 123/97 B |
| 4,071,006 | 1/1978 | Harada | 123/119 A |

Primary Examiner—Martin P. Schwadron
Assistant Examiner—A. Michael Chambers
Attorney, Agent, or Firm—Sughrue, Rothwell, Mion, Zinn and Macpeak

[57] ABSTRACT

A pneumatic pressure control system which controls the ratio of fuel to air in the intake manifold of the engine includes a valve assembly which is operative in response to the combined action of the negative pressure existing in the intake manifold and positive pressure from an air pump operated by the engine. When the sum of the negative and positive pressures acting on opposite sides of a diaphragm are sufficient to overcome a spring force on the negative pressure side of the diaphragm the movement of the diaphragm will cause the operation of the valve to admit atmospheric air pressure either directly into the intake manifold or to a fuel regulating device to operate a further valve to reduce the supply of fuel to the carburetor.

4 Claims, 2 Drawing Figures

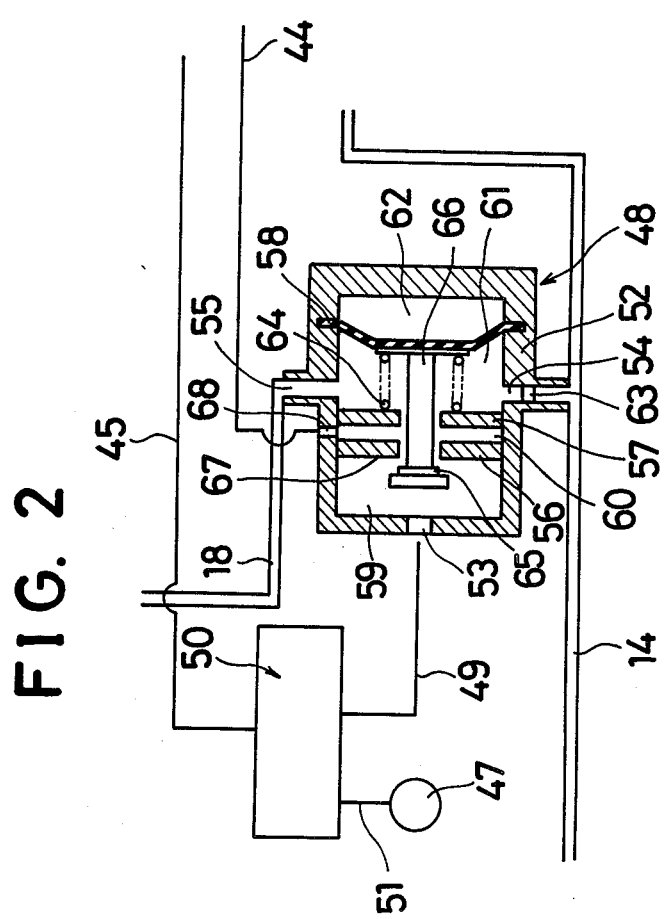

PNEUMATIC PRESSURE CONTROL VALVE ASSEMBLY

BACKGROUND OF THE INVENTION

1. Field of the Invention

The present invention relates to a valve assembly and more particularly to a pneumatic pressure control valve assembly operative in response to and utilizing both positive and negative fluid pressures as control signals.

2. Prior Art

Various systems and devices have recently been proposed for emission control for vehicles in which valve assemblies responsive to an intake manifold vacuum signal downstream of the throttle valve are incorporated. In a particular prior system, the valve assembly must satisfy the requirement wherein the valve member closes (or opens) the fluid passage during engine idling and opens (or closes) the fluid passage during engine deceleration. Normally, the manifold vacuum during engine deceleration is higher than that during engine idling, however, the reverse condition of relative vacuum may occur due to various adjustment problems, such as operational adjustments of engine intake and exhaust valves. Therefore, it may be possible that the above requirement can not be satisfied.

For example, when the valve assembly is adapted to control the operation of a fuel regulator having main and slow fuel supply lines, it is desirable that the valve assembly assures the fuel supply of both main and slow lines during engine idling, but the valve assembly closes the fuel supply of the slow line during engine deceleration. In an L.P.G. vehicle wherein the fuel can be sufficiently drawn in by increasing the opening of the throttle valve, the supply of fuel may be in proportion to the change in the degree of opening of the throttle valve. In order to avoid the undesirable stopping of the engine especially during engine idling, the supply of fuel through the slow fuel line as well as the main fuel line is necessary. The slow fuel line should be closed during engine deceleration to prevent damage to the catalytic converter and reduce HC, CO in the exhaust gas.

Similarly, the controlled output of fluid through the valve assembly may be transmitted to the intake manifold. By means of such a valve assembly, air is introduced into the manifold during engine deceleration to reduce HC and CO within the exhaust gas and to prevent backfire of the engine, but introduction of air is stopped during engine idling to avoid the undesirable stopping of the engine.

In summary, it is possible that the desirable controlled output pressure can not be produced in the prior valve assembly utilizing only manifold vacuum pressure as a control signal. It should be noted that vacuum pressure at the intake manifold is variable in response to the altitude or the environment in which the engine is operating.

SUMMARY OF THE INVENTION

It is, therefore, an object of the present invention to provide an improved valve assembly which obviates the various drawbacks mentioned above.

It is another object of the present invention to provide an improved valve assembly which utilizes both positive and negative pneumatic pressures as control signals.

It is still another object of the present invention to provide an improved valve assembly which utilizes both intake manifold vacuum pressure and air pump pressure as control signals, both signals being imparted to the valve assembly for the same direction of valve operation.

It is a further object of the present invention to provide an improved valve assembly of the above mentioned type which is incorporated in the fuel regulating system.

It is a still further object of the present invention to provide an improved valve assembly of the above type which prevents the undesirable stopping of the engine and reduces HC and CO within the exhaust gas.

It is still another object of the present invention to provide an improved valve assembly which can more reliably detect engine deceleration.

It is still another object of the present invention to provide an improved valve assembly of the above type having an altitude compensating function.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a cross-sectional view of another valve mechanism which is incorporated within the fuel supply system of FIG. 1 and controls the supply of fuel through slow fuel line.

DETAILED DESCRIPTION OF THE INVENTION

Figure 1:
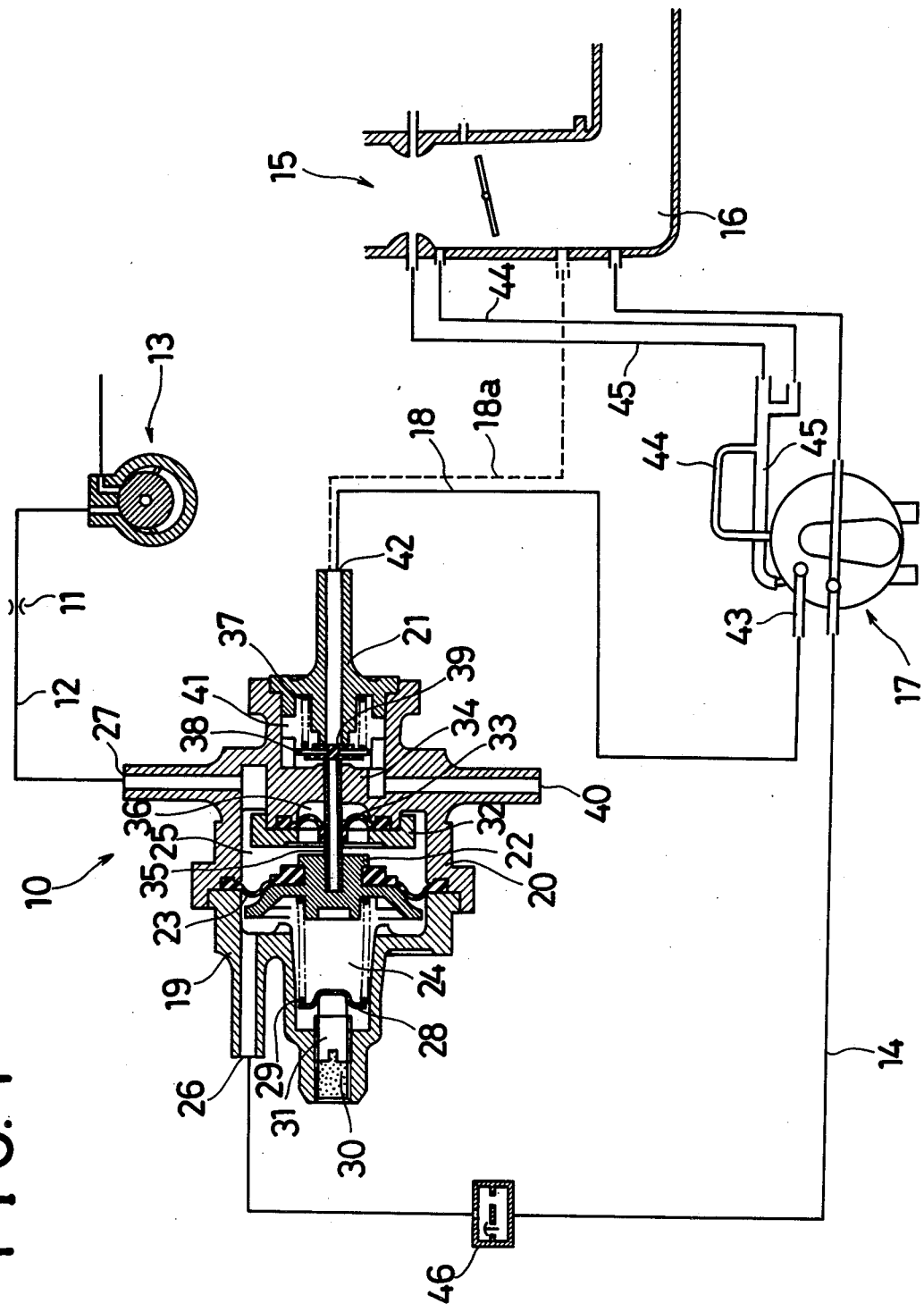
FIG. 1 is a cross-sectional view of a valve assembly according to the present invention which is incorporated within a fuel supply system, as shown schematically.

Referring now to the drawings, a preferred embodiment of the present invention will be explained in detail.

A valve assembly 10 according to the present invention is incorporated within a fuel supply system for vehicles. The valve assembly 10 is pneumatically connected to a source of positive pneumatic pressure such as air pump 13 via a conduit 12 having an orifice 11 therein at one side and is pneumatically connected to a source of negative or vacuum pressure such as an intake manifold 16 downstream of a carburetor 15 via a conduit 14 at the other side. The valve assembly 10 is adapted to deliver an output of air to a conduit 18, which leads to a fuel regulator 17 arranged within the conduit 14 in response to both the positive pressure of air pump 13 and the vacuum pressure at intake manifold 16, as will be explained in detail hereinafter.

The valve assembly 10 comprises first, second and third bodies 19, 20 and 21. A first diaphragm member 23 has an outer periphery which is sealingly held by means of said first and second bodies 19 and 20 and an inner periphery which is sealingly secured to a slidable member 22 so that vacuum or negative pressure chamber 24 and positive pressure chamber 25 are defined within the bodies 19 and 20. The negative pressure chamber 24 is adapted to receive manifold vacuum pressure at the intake manifold 16 through means of an inlet 26 provided in the first body 19 and the conduit 14, while the positive pressure chamber 25 is adapted to receive positive pressure from air pump 13 through means of an inlet 27 provided in the second body 20 and the conduit 12. Therefore, the slidable member 22 and the diaphragm 23 are urged toward the left by means of both the vacuum within the negative pressure chamber 24 and positive pressure within the positive pressure chamber 25. Against the above negative and positive pressures, the slidable member 22 and the diaphragm 23 are urged toward the right by means of a spring 29 one end of which is seated against the slidable member 22 and the other end of which is seated against a retainer 28. The position of the retainer 28 is adjustable by a screw or bolt 31 which is threaded through the first body 19 through a silicon seal member 30 whereby the biasing force of the spring 29 can be adjustable. A second diaphragm 33 has an outer periphery which is sealingly held by the second body 20 and a stationary member 32 secured to the body 20. The inner periphery of the diaphragm 33 is secured to a member 35 which is press fitted to the slidable member 22 and has an extension which, in turn, is slidable within an inward extension 34 of the second body 20. Thus the positive pressure chamber 25 is sealingly separated from a chamber 36. A valve member 38 is normally positioned in its illustrated position by means of the member 35 against a biasing force of a spring 37 one end of which is seated against the third body 21 so that the valve member 38 is brought in contact with a valve seat 39 provided on the third body 21. This means that an atmospheric chamber 41 which leads to the atmosphere through a port 40 provided in the second body 20 is interrupted from an outlet port 42 which is provided in the third body 21 and leads to the conduit 18.

The conduit 18 leads to an inlet signal port 43 of the fuel regulator 17 so that the fuel supply of a slow fuel passage or line 44 is on-off controlled by the signal pressure transmitted to the port 43. The numeral 45 denotes a main fuel supply passage or line. The fuel regulator 17 may be of the well known type, but a more detailed construction thereof is illustrated in FIG. 2.

In FIG. 2, a fuel tank 47 is connected to a fuel pressure regulating means 50 of a conventional type via a conduit 51. The regulating means 50 is connected to the main supply line 45 at one side and is connected to a valve means 48 for the slow fuel line 44 via a conduit 49 at the other side. The main fuel supply line 45 is always in communication with the tank 47 through the regulating means 50, but the slow fuel supply is controlled by the valve means 48, as will be apparent hereinafter. The valve means 48 comprises a housing 52 having inlet ports 53, 54 and 55. The housing 52 also has two walls, 56 and 57 and a diaphragm 58 to thereby define four chambers 59, 60, 61 and 62 within the housing 52. The chamber 61 receives the manifold vacuum pressure through the inlet port 54 having an orifice 63 and the conduit 14. Thus the vacuum pressure within the chamber 61 urges the diaphragm 58 toward the left against a spring 64 to cause a valve position 65 on a stem 66 secured to the diaphragm 58 to disengage from a valve seat 67 on the wall 56. When the parts of the valve means 48 are in their illustrated positions, the chamber 59 is connected to the chamber 60, so fuel in the tank 47 can be transmitted to the slow fuel line 44 through an outlet 68. When the atmospheric air is introduced within the chamber 61 through the valve assembly 10, the diaphragm 58 is urged to be moved toward the right by spring 64. Therefore, the valve position 65 is brought in contact with the valve seat 67 to close the slow fuel line 44.

The conduit 14 may include a delay mechanism 46 therein to delay the transmitting of vacuum pressure from the intake manifold 16 to the valve assembly 10.

In the construction of the valve assembly 10 mentioned above, the biasing force of the spring 29 is such arranged that it can maintain the slidable member 22 in its illustrated or original position even when the negative pressure chamber 24 receives maximum manifold vacuum pressure. In other words, the slidable member 22 can be moved toward the left against the spring 29 only when the negative pressure chamber 24 receives substantial maximum vacuum pressure and the positive pressure chamber 25 receives positive pressure which is higher than a predetermined value. It is noted that value of the positive pressure delivered from the air pump 13 may be in proportion to revolution of the engine. Thus, during the engine operation except for the decelerating condition of the engine, that is to say, during negative and positive pressures within chambers 24 and 25 will be less than the biasing force of the spring 29, the slidable member 22 is kept in its illustrated position. Accordingly, the valve member 38 is in contact with the seat 39 and no air is introduced into the conduit 18. This results in that the chamber 61 of valve means 48 for slow fuel supply line receives no air so that the valve means 48 is in its position wherein it can supply fuel through the slow supply line depending on the vacuum degree at the intake manifold 16. As will be clear hereinbefore, if the vacuum degree at the intake manifold 16 increases to considerably high value during idling condition of the engine, no air is introduced into the conduit 18 since the positive pressure within the positive pressure chamber 25 is less than the predetermined value. So, the slow fuel supply line as well as the main fuel supply line may be opened to prevent the undesirable stopping of engine operation.

During the decelerating condition of engine operation, vacuum degree at the intake manifold 16 becomes to be the maximum value, and the positive pressure from the air pump 13 reaches the predetermined value. Therefore, the slidable member 22 with the member 35 will be urged to be moved toward the left against the spring 29 so that the valve member 38 is disengaged from the seat 39 by means of the spring 37. Now, air is introduced into the chamber 61 of valve means 48 via the conduit 18 and there is no difference between fluid pressures within chambers 61 and 62. Thus, the diaphragm 58 with the valve portion 65 is moved toward the right by means of spring 64 so as to close the fluid communication between chambers 59 and 60. This means that the fuel supply through slow fuel line 44 is interrupted. However, it should be noted that the transmission of vacuum pressure from the intake manifold 16 to the valve assembly 10 can be delayed by means of the delay mechanism 46 because the check valve therein is closed. It is apparent, therefore, that the fuel supply through the slow fuel line 44 is interrupted only when the decelerating condition of the engine operation continues for a relatively long time, longer than a predetermined time.

During the decelerating condition of engine operation, the atmospheric pressure may be introduced directly into the venturi of the carburetor in response to increased vacuum pressure in the intake manifold and positive pressure of the air pump. This reduces the ratio of fuel to air being supplied to the engine. The outlet port 42 of valve assembly 10 may be connected to the intake manifold 16 as shown by dotted line 18a in FIG.

1, but not to the fuel regulator 17. In this system, air is introduced to the intake manifold 16 so as to vary the ratio of fuel to air when the valve assembly 10 is in its operative position. Thus CO and HC within the exhausted gas will be reduced and backfire of the engine will be prevented.

It should be noted that in the above construction of the valve assembly 10, diaphragm 23 with slidable member 22 is urged towards the left by both manifold vacuum pressure and positive pressure. Therefore, the valve assembly 10 operates in a proper way, and variations in altitude of the engine will be compensated. More, particularly, both manifold vacuum pressure and positive pressure urge the diaphragm in the same direction. The effective force of vacuum and positive pressures which urge the diaphragm therefore will not be substantially changed regardless of the altitude in which engine is operating, because both pressures will be decreased in predetermined ratios, respectively since the absolute pressure is reduced. This means that the valve assembly also provides an altitude compensating function.

While the invention has been particularly shown and described with reference to a preferred embodiment thereof it will be understood by those in the art that various changes in form and details may be made therein without departing from the spirit and scope of the invention.

What is claimed is:

1. In a pneumatic pressure control system in combination with an internal combustion engine including an intake manifold which provides a source of negative pneumatic pressure, an air pump driven by said engine which provides a source of positive pneumatic pressure, passage means for introducing atmospheric pressure into said system and a pneumatic pressure control valve assembly, said control valve assembly comprising a body, slidable actuator means slidably disposed within said body including means defining first and second pressure chambers within said body, said first chamber being connected to said source of negative pneumatic pressure and said second chamber being connected to said source of positive pneumatic pressure, a spring arranged within said first chamber and urging said slidable means against the positive pneumatic pressures within said second chambers, means for defining a third chamber within said body said second chamber being disposed between said first and third chambers, said third chamber being connected to said passage means and to an outlet port and valve means located within said third chamber operatively connected to said slidable means for controlling fluid communication between the passage means and said outlet port, said valve means having substantially the entire effective surface thereof exposed to said atmospheric pressure from said passage means so that substantially equal pressure will be exerted on said valve means by the atmospheric pressure in all positions of the valve means whereby the opening and closing of the valve means will be controlled by movement of said slidable means which is responsive only to changes in said negative and positive fluid pressures within the first and second chambers biasing the valve means in one direction and the spring biasing the valve means in an opposite direction.

2. In a pressure control system as set forth in claim 1, wherein said valve means is urged into its open position by an additional spring also located in said third chamber.

3. In a pressure control system as set forth in claim 1, further comprising a pneumatically operated fuel regulator operatively connected to said intake manifold and said outlet port.

4. In a pressure control system as set forth in claim 1, wherein said outlet port is further connected to said intake manifold.

* * * * *